(12) United States Patent
Tong

(10) Patent No.: US 12,503,143 B2
(45) Date of Patent: Dec. 23, 2025

(54) AERIAL ELECTROMAGNETIC FLYING VEHICLE

(71) Applicant: Zeyao Tong, Shanxi (CN)

(72) Inventor: Zeyao Tong, Shanxi (CN)

( * ) Notice: Subject to any disclaimer, the term of this patent is extended or adjusted under 35 U.S.C. 154(b) by 766 days.

(21) Appl. No.: 17/635,007

(22) PCT Filed: May 24, 2021

(86) PCT No.: PCT/CN2021/095466
§ 371 (c)(1),
(2) Date: Feb. 14, 2022

(87) PCT Pub. No.: WO2022/134450
PCT Pub. Date: Jun. 30, 2022

(65) Prior Publication Data
US 2023/0339520 A1    Oct. 26, 2023

(30) Foreign Application Priority Data

Dec. 21, 2020 (CN) ......................... 202011515439.X

(51) Int. Cl.
| | | |
|---|---|---|
| *B61B 3/02* | (2006.01) | |
| *B60L 13/04* | (2006.01) | |
| *B61B 12/00* | (2006.01) | |
| *B61B 13/10* | (2006.01) | |

(52) U.S. Cl.
CPC ................ *B61B 3/02* (2013.01); *B60L 13/04* (2013.01); *B61B 12/00* (2013.01); *B61B 13/10* (2013.01); *B60L 2200/26* (2013.01)

(58) Field of Classification Search
CPC ........... B61B 3/02; B61B 12/00; B61B 13/10; B60L 13/04; B60L 2200/26
See application file for complete search history.

(56) References Cited

U.S. PATENT DOCUMENTS

| | | | | |
|---|---|---|---|---|
| 5,146,853 | A * | 9/1992 | Suppes | ................. B60L 15/005 104/282 |
| 12,103,569 | B2 * | 10/2024 | Chen | ....................... B61B 13/08 |
| 2023/0339520 | A1 * | 10/2023 | Tong | ....................... B61B 12/00 |

FOREIGN PATENT DOCUMENTS

| | | |
|---|---|---|
| CN | 1613703 A | 5/2005 |
| CN | 102765394 A | 11/2012 |
| CN | 105480233 A | 4/2016 |

(Continued)

*Primary Examiner* — Jason C Smith
(74) *Attorney, Agent, or Firm* — Calfee, Halter & Griswold LLP

(57) ABSTRACT

The invention discloses an aerial electromagnetic flying vehicle, comprising a flying vehicle and a rail system; the flying vehicle includes a vehicle body, permanent magnets, solenoid coils, a compressed air pump, an intake manifold, an exhaust manifold, a braking device and electric propellers on the braking device and tail section of the flying vehicle; the permanent magnet is set at the end of the flying vehicle, four solenoid coils correspondingly sleeved on the permanent magnet, and the compressed air pump is set inside the vehicle body; one end of the intake manifold is connected to the compressed air pump, and the other end penetrates the vehicle body and communicates with the outside; the braking device is provided on the vehicle body; the rail system includes rails, rubber tracks, and support plates; the rail is set above the vehicle body, and the rubber track is set below the rail.

8 Claims, 3 Drawing Sheets

(56) References Cited

FOREIGN PATENT DOCUMENTS

| | | | | |
|---|---|---|---|---|
| CN | 108657011 A | * | 10/2018 | ............. B60L 13/04 |
| CN | 108674421 A | * | 10/2018 | |
| CN | 108706013 A | | 10/2018 | |
| CN | 109973561 A | * | 7/2019 | |
| CN | 109094422 B | * | 4/2020 | ............ B60L 13/003 |
| CN | 112677999 A | | 4/2021 | |
| DE | 4223307 A1 | * | 3/1993 | ............. B60L 13/06 |

* cited by examiner

AERIAL ELECTROMAGNETIC FLYING VEHICLE

BACKGROUND OF THE INVENTION

1. Field of the Invention

The invention relates to the technical field of rail transit, in particular to an aerial electromagnetic flying vehicle.

2. Description of Related Art

After more than 130 years, the development of automotive industry has reached its peak. At present, the number of motor vehicles in China has reached 360 million. The huge amount of motor vehicles has brought great traffic pressure to the city. Traffic jams at work and at travel have become a more and more serious problem that restricts our development. The traditional maglev train is expensive, complex to maintain and costly to use. Against this, an aerial electromagnetic flying vehicle is proposed.

SUMMARY OF THE INVENTION

The technical problem to be solved by the invention is to overcome the above defects and provide:
- an aerial electromagnetic flying vehicle, comprising a flying vehicle and a rail system;
- the flying vehicle includes a vehicle body, a permanent magnet, a solenoid coil, a compressed air pump, an intake manifold, an exhaust manifold, a braking device and electric propellers at the tail section of the flying vehicle; four permanent magnets are respectively set at the end of the flying vehicle, four solenoid coils are correspondingly sleeved on the permanent magnet, and the compressed air pump is set inside the vehicle body; one end of the intake manifold is connected to the compressed air pump, and the other end penetrates the vehicle body and communicates with the outside; one end of the exhaust manifold is connected to the compressed air pump, and the other end penetrates the vehicle body and communicates with the outside; the braking device is provided on the vehicle body; the electric propellers are provided at the tail section of the vehicle body and provide power as an auxiliary power source;
- the rail system includes rails, rubber tracks, and support plates; the rail is arranged above the vehicle body, and cooperates with the permanent magnet and solenoid coil; the rubber track is arranged below the rail and is not necessarily connected to each other, and cooperates with the braking device; the support plate is arranged at the lower end of the rubber track.

As an improvement, the intake manifold has two branch manifolds, which respectively penetrate the vehicle body from its front end and the top end and are connected with the compressed air pump.

As an improvement, the solenoid coil is sleeved on the permanent magnet; by adjusting the magnitude and direction of the current of the solenoid coil, the magnetic force of the whole solenoid coil and the permanent magnet is controlled.

As an improvement, the braking device is rotatably attached to the vehicle body, and the braking device is retractable.

As an improvement, the end of the braking device is provided with a rubber pad, the rubber track is provided with a rubber groove, the rubber pad and the rubber groove are mutually cooperate.

As an improvement, a distance sensor is provided at the position of the vehicle body close to the rail system, for judging the distance between the vehicle body and the rail system.

As an improvement, the center of gravity of the vehicle body is provided with a gyroscope to judge the balance state of the vehicle body of the flying vehicle.

As an improvement, the flying vehicle and the track system are arranged in a circular pipe tunnel to reduce the influence of wind.

Compared with the prior art, the advantages of the invention are: the electromagnetic flying of vehicle in the air is non-contact air flight, which is not subject to other external resistance except for air resistance. Compared with vehicles such as cars, the invention possesses smaller external resistance, higher energy utilization rate, and less energy consumption. Electromagnetic flying vehicles that use compressed air as a power source are pollution-free vehicles.

The aerial electromagnetic flying vehicle can make full use of urban space, save energy and protect the environment, which is more in line with the development needs of modern people to protect the environment and avoid global warming.

Figure 1:
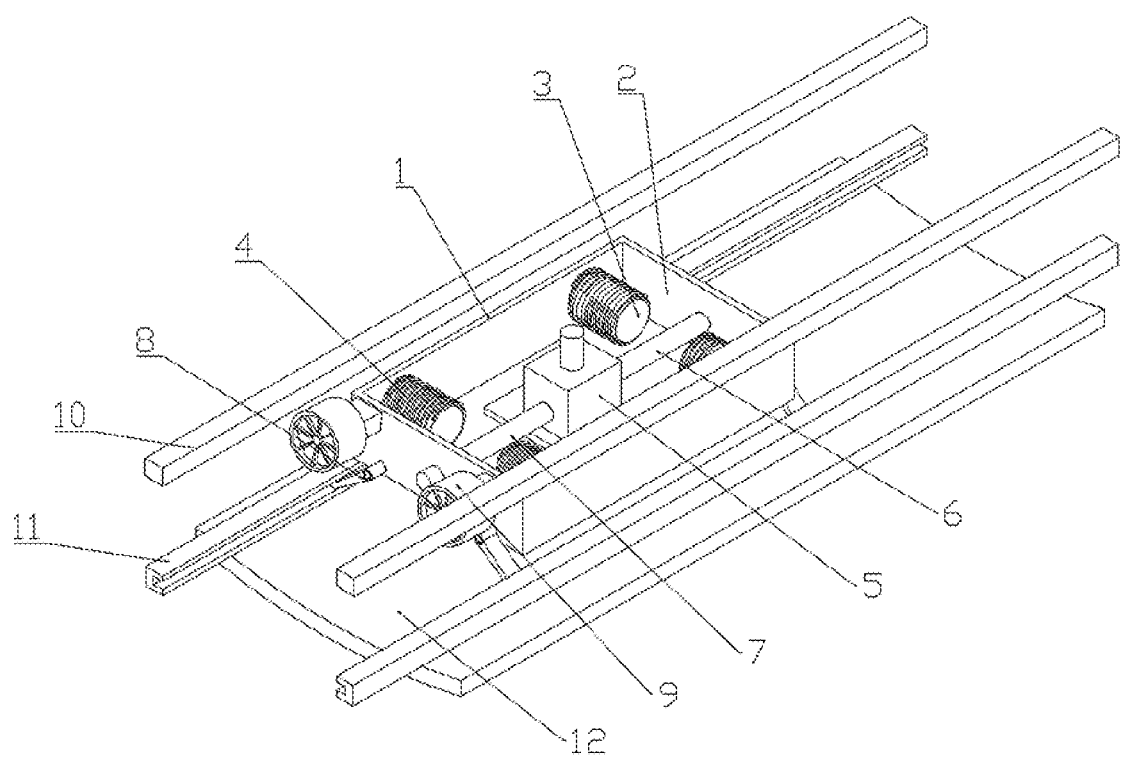
FIG. 1 is an overall structure diagram of an aerial electromagnetic flying vehicle according to the invention.

In the drawings, 1 refers to the flying vehicle; 2 refers to the vehicle body; 3 refers to the permanent magnet; 4 refers to the solenoid coil; 5 refers to the compressed air pump; 6 refers to the intake manifold; 7 refers to the exhaust manifold; 8 refers to the braking device; 9 refers to the electric propeller; 10 refers to the rail; 11 refers to the rubber track; 12 refers to the support plate; 13 refers to the rubber pad; 14 refers to the rubber groove; 15 refers to the gyroscope.

DETAILED DESCRIPTION OF THE PREFERRED EMBODIMENTS

Embodiments of the invention are described in detail hereinafter, examples of which are illustrated in the accompanying drawings. The same or similar reference numbers throughout refer to the same or similar elements or elements having the same or similar functions. In the description of the invention, it should be understood that the orientation or positional relationship indicated by the terms "upper", "lower", "front", "rear", "left", "right", "inner", "outer", "vertical", "circumferential", etc. is based on the orientation or positional relationship shown in the drawings, which are only for the convenience of describing the invention and simplifying the description, rather than indicating or implying that the referred device or element must have a specific orientation, be constructed and operated in a specific orientation, and therefore cannot be understood to limit the invention.

In the description of the invention, "iron" does not only refer to the material of iron, it refers to all substances similar to iron that can be attracted by magnets, including but not limited to iron, steel and current-carrying wires and coils, etc.

In the description of the invention, "rail" is only for the convenience of describing the invention and simplifying the description, rather than indicating or implying the shape and features of the referred device. It is only for describing two continuously departed objects, whose cross-sectional area shapes include but are not limited to, circle, square, triangle, and bar, etc.

In the description of the invention, the "support plate" is not just a flat plate, but refers to any system structure that can support the vehicle body to stay in the air.

In the description of the invention, "first feature" and "second feature" may include one or more of the features. In addition, the terms "first" and "second" are only used for descriptive purposes, and should not be construed as indicating or implying relative importance or implying the number of indicated technical features. Thus, a feature defined as "first" or "second" may expressly or implicitly include one or more of that feature.

The aerial electromagnetic flying vehicle is further described in detail with reference to the drawings hereinafter.

Figure 2:
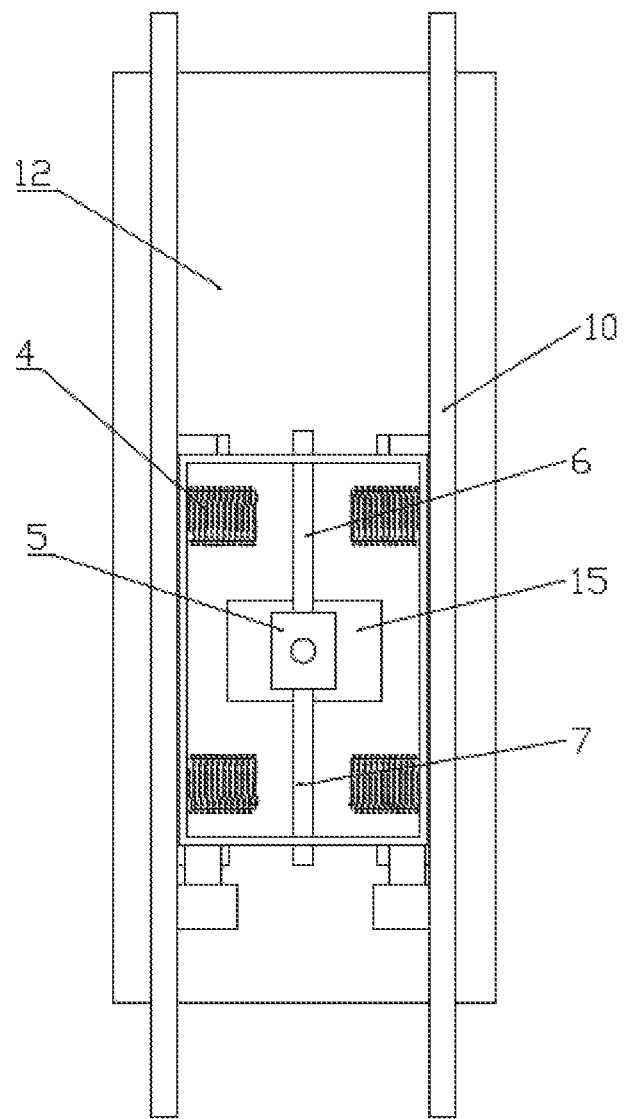
FIG. 2 is a plan view of the aerial electromagnetic flying vehicle according to the invention.
Figure 3:
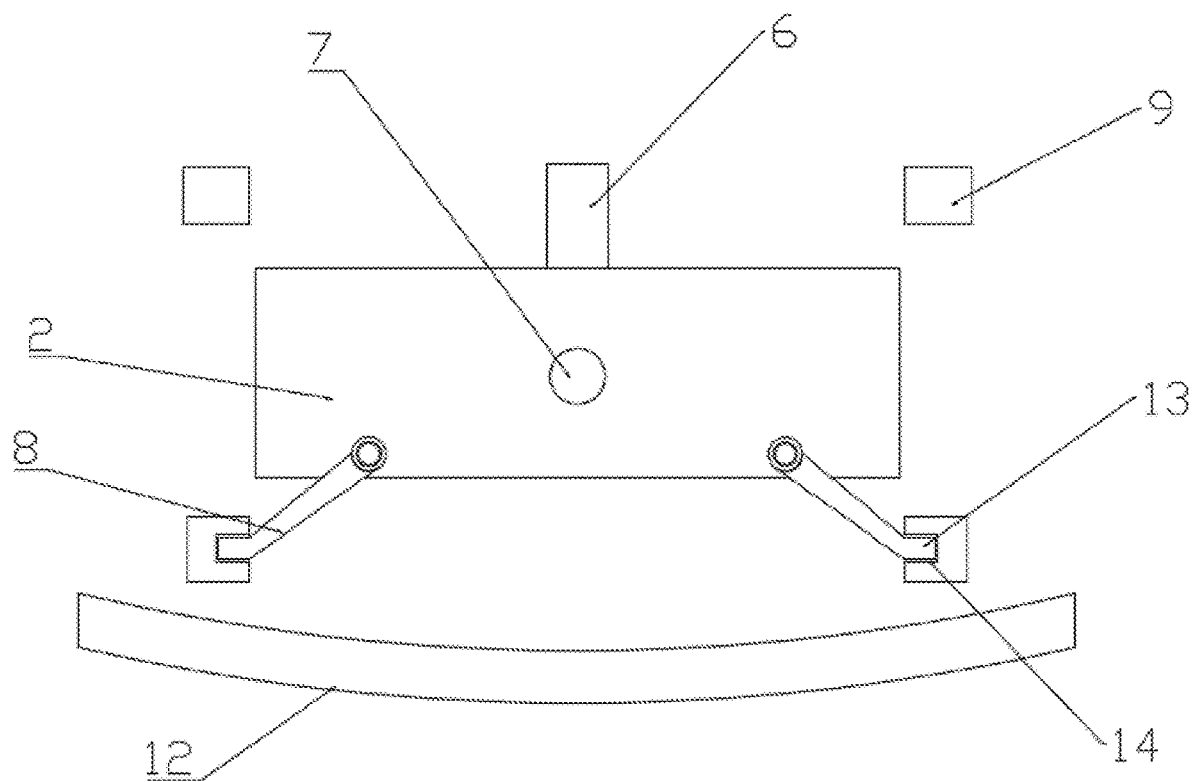
FIG. 3 is a front view of the aerial electromagnetic flying vehicle according to the invention.

With reference to FIG. 1 to FIG. 3, an aerial electromagnetic flying vehicle, comprises a flying vehicle and a rail system;

with reference to FIG. 1 to FIG. 3, the flying vehicle includes a vehicle body 2, a permanent magnet 3, a solenoid coil 4, a compressed air pump 5, an intake manifold 6, an exhaust manifold 7, a braking device 8 and electric propellers 9 at the tail section of the flying vehicle; four permanent magnets 3 are respectively set at the end of the flying vehicle 1, four solenoid coils 4 are correspondingly sleeved on the permanent magnet 3, and the compressed air pump 5 is set inside the vehicle body 2; one end of the intake manifold 6 is connected to the compressed air pump 5, and the other end penetrates the vehicle body 2 and communicates with the outside; one end of the exhaust manifold 7 is connected to the compressed air pump 5, and the other end penetrates the vehicle body 2 and communicates with the outside; the braking device 8 is provided on the vehicle body 2; the electric propellers 9 are provided at the tail section of the vehicle body 2 and provide power as an auxiliary power source;

with reference to FIG. 1 to FIG. 3, the rail system includes rails 10, rubber tracks 11, and support plates 12; the rail 10 is arranged above the vehicle body 2, and cooperates with the permanent magnet 3 and solenoid coil 4; the rubber track 11 is arranged below the rail 10 and is not necessarily connected to each other, and cooperates with the braking device 8; the support plate 12 is arranged at the lower end of the rubber track 11.

In the embodiment, as is shown in FIG. 1 to FIG. 3, the intake manifold 6 has two branch manifolds, which respectively penetrate the vehicle body 2 from its front end and the top end and are connected with the compressed air pump 5.

In the embodiment, as is shown in FIG. 1 to FIG. 3, the braking device 8 is rotatably attached to the vehicle body 2, and the braking device 8 is retractable.

In the embodiment, as is shown in FIG. 1 to FIG. 3, the end of the braking device 8 is provided with a rubber pad 13, the rubber track 11 is provided with a rubber groove 14, the rubber pad 13 and the rubber groove 14 are mutually cooperate.

In the embodiment, as is shown in FIG. 1 to FIG. 3, a distance sensor is provided at the position of the vehicle body 2 close to the rail system, for judging the distance between the vehicle body 2 and the rail system.

In the embodiment, as is shown in FIG. 1 to FIG. 3, the center of gravity of the vehicle body 2 is provided with a gyroscope 15 to judge the balance state of the vehicle body 2 of the flying vehicle In the embodiment, as is shown in FIG. 1 to FIG. 3, the flying vehicle 1 and the track system are arranged in a circular pipe tunnel to reduce the influence of wind.

The working principle of the invention: in the invention, in order to make the electromagnetic aerial vehicle levitate and fly, four strong permanent magnets 3 are respectively arranged in the vehicle body 2, and an electrified solenoid coil 4 is wrapped around the permanent magnets. The permanent magnets 3 and solenoid coils 4 interact together with the rails 10 in the track system to levitate the vehicle. The power system consists of a compressed air pump 5, an air intake manifold 6 and an air outlet manifold 7. The compressed air pump 5 inhales air from the intake manifold 6 and compresses it, and then pumps it backward through the air outlet manifold 7 to obtain reverse thrust, which is used to propel the flying vehicle 1 forward along the rail 10. The braking device 8 is retractable and rotatably connected with the vehicle body 2. During the running process of the flying vehicle 1, the braking device 8 is in the retracted state. When braking, the braking device 8 stretches, and the rubber pad 13 provided on the braking device 8 abuts with the rubber groove 14 on the rubber track 11, the friction generated can instantly stop the flying vehicle 1. The rubber groove 14 also acts as a limit when the vehicle is stopped, preventing the flying vehicle 1 from falling out of the track system.

The invention and its embodiments have been described above, and the description is not restrictive. What is shown in the drawings is only one of the embodiments of the invention, and the actual structure is not limited to this. All in all, if those of ordinary skill in the art are inspired, and without departing from the purpose of the invention, any structure and embodiment similar to the technical solution designed by them without creativity shall all belong to the protection scope of the invention

What is claimed is:

1. An aerial electromagnetic flying vehicle, comprising a flying vehicle (1) and a rail system; the flying vehicle includes a vehicle body (2), a permanent magnet (3), a solenoid coil (4), a compressed air pump (5), an intake manifold (6), an exhaust manifold (7), a braking device (8) and electric propellers (9) at the tail section of the flying vehicle (1); four permanent magnets (3) are respectively set at the end of the flying vehicle (1), four solenoid coils (4) are correspondingly sleeved on the permanent magnet (3), and the compressed air pump (5) is set inside the vehicle body (2); one end of the intake manifold (6) is connected to the compressed air pump (5), and the other end penetrates the vehicle body (2) and communicates with the outside; one end of the exhaust manifold (7) is connected to the compressed air pump (5), and the other end penetrates the vehicle body (2) and communicates with the outside; the braking device (8) is provided on the vehicle body (2); the electric propellers (9) are provided at the tail section of the vehicle body (2) and provide power as an auxiliary power source;

the rail system includes two rails (10), two rubber tracks (11), and a support plate (12); the two rails (10) are arranged above the vehicle body (2), and cooperates with the permanent magnet (3) and solenoid coil (4); the two rubber tracks (11) are arranged below the two rails (10), and cooperates with the braking device (8); the support plate (12) is arranged at the lower end of the rubber track (11), wherein each of the two rubber tracks (11) has a flat outer surface and an inner surface provided with a rubber groove (14);

wherein the braking device (8) is retractable, the braking device (8) is in a retracted state during running process of the flying vehicle (1), and the braking device (8) stretches into the rubber groove (14) and abuts with the rubber groove (14) when the flying vehicle (1) brakes.

2. The aerial electromagnetic flying vehicle according to claim 1, wherein the intake manifold (6) has two branch manifolds, which respectively penetrate the vehicle body (2) from its front end and the top end and are connected with the compressed air pump (5).

3. The aerial electromagnetic flying vehicle according to claim 1, wherein the solenoid coil (4) is sleeved on the permanent magnet (3); by adjusting the magnitude and direction of the current of the solenoid coil (4), the magnetic force of the whole solenoid coil (4) and the permanent magnet (3) is controlled.

4. The aerial electromagnetic flying vehicle according to claim 1, wherein the braking device (8) is rotatably attached to the vehicle body (2).

5. The aerial electromagnetic flying vehicle according to claim 1, wherein the end of the braking device (8) is provided with a rubber pad (13), the rubber pad (13) and the rubber groove (14) are mutually cooperate.

6. The aerial electromagnetic flying vehicle according to claim 1, wherein a distance sensor is provided at the position of the vehicle body (2) close to the rail system.

7. The aerial electromagnetic flying vehicle according to claim 1, wherein the center of gravity of the vehicle body (2) is provided with a gyroscope (15).

8. The aerial electromagnetic flying vehicle according to claim 1, wherein the flying vehicle (1) and the track system are arranged in a circular pipe tunnel to reduce the influence of wind.

* * * * *